June 5, 1962 C. W. MODERSOHN 3,037,586
MOMENTUM TYPE TORQUE PRODUCING DEVICE
Filed May 18, 1959 3 Sheets-Sheet 3

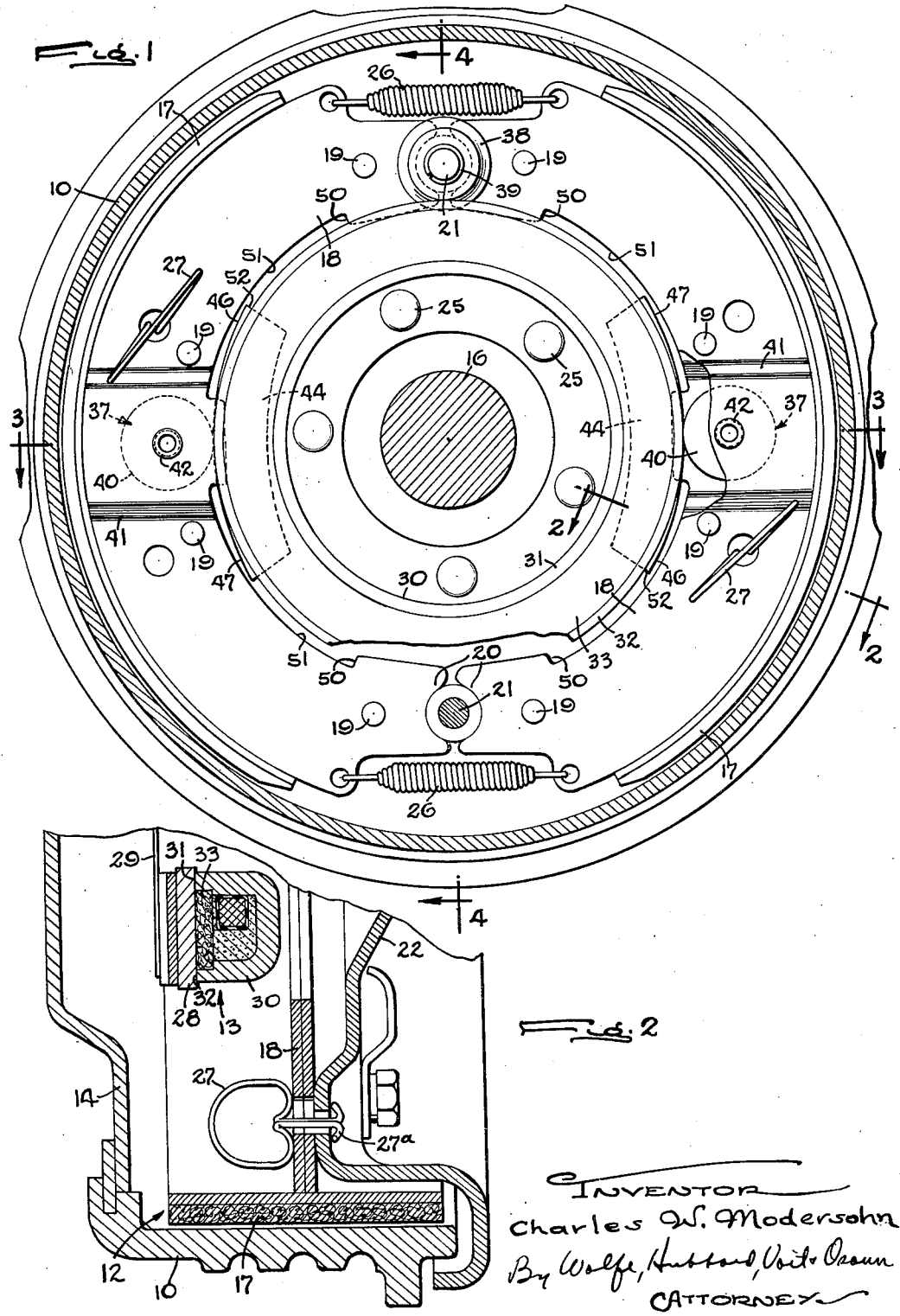

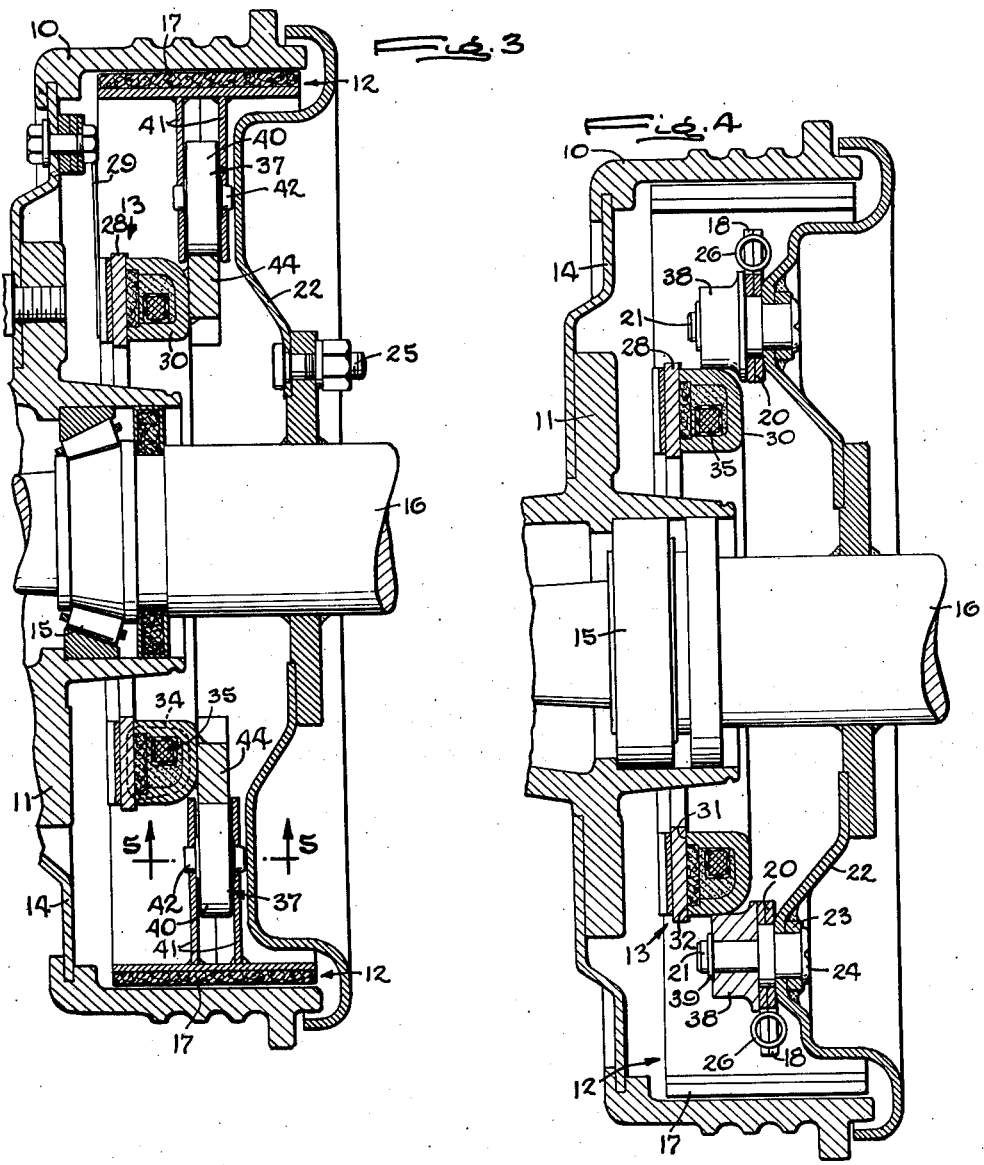
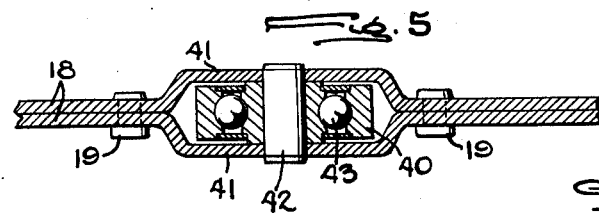

INVENTOR
Charles W. Modersohn
By Wolfe, Hubbard, Voit & Osann
ATTORNEYS

United States Patent Office 3,037,586
Patented June 5, 1962

3,037,586
MOMENTUM TYPE TORQUE PRODUCING DEVICE
Charles W. Modersohn, Beloit, Wis., assignor to Warner Electric Brake & Clutch Company, South Beloit, Ill., a corporation of Illinois
Filed May 18, 1959, Ser. No. 813,786
8 Claims. (Cl. 188—138)

This invention relates to friction brakes and clutches of the type in which the main friction elements such as a rotating drum and coacting shoes are pressed into gripping engagement by a cam or the like actuated by rotary torque derived through a pilot friction clutch from the kinetic energy of a rotary part whose motion is to be controlled. In prior devices of this type, particularly vehicle brakes, the driven element of the pilot clutch has been a rigid ring concentric with the brake axis and mounted to turn in either direction away from a normal released position. Heretofore, the support for the actuator ring has been a plain bearing of large diameter requiring accurate fitting within the ring and centering on the brake axis so as to avoid the danger of binding while remaining unlubricated in long periods of service use.

The general object of the present invention is to greatly simplify and reduce the cost of mounting the actuator ring in devices of the above character while insuring easier operation without lubrication during a long period of service use.

Another object is to journal the actuator ring on a plurality of small bearings angularly spaced around the bearing axis and mounted on the operating elements of the brake or clutch.

A more detailed object is to provide a multiple shoe brake of the above character in which the actuator ring is journaled on pins angularly spaced around the brake axis and forming the anchors for the brake shoes and the followers through which the motion of the actuator ring is applied to the shoes.

The invention also resides in the novel arrangement of the shoes which permits the anchor and actuator pins to function as the bearing for the ring.

Other objects and advantages of the invention will become apparent from the following detailed description taken in connection with the accompanying drawings, in which FIGURE 1 is a fragmentary diametrical sectional view of a brake embodying the novel features of the present invention.

FIGS. 2, 3 and 4 are sections taken respectively along the lines 2—2, 3—3 and 4—4 of FIG. 1.

FIG. 5 is a fragmentary section taken along the line 5—5 of FIG. 3.

Figure 6:
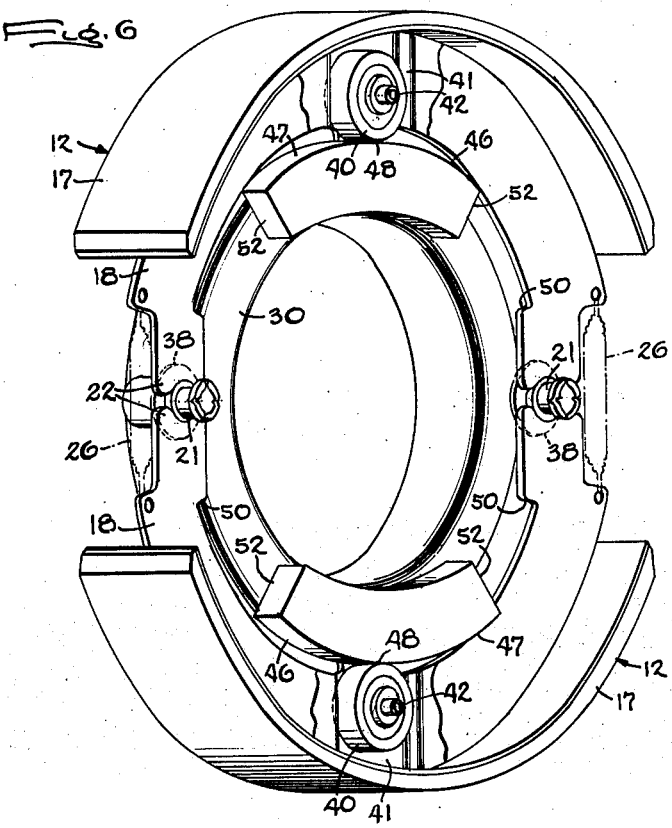
FIG. 6 is a fragmentary perspective view of the operating parts of the brake.

For purposes of illustration, the invention is shown incorporated in a vehicle brake of the internal expanding type comprising generally a cylindrical drum 10 rotatable with a wheel 11 or other part to be retarded and coacting with a plurality of relatively rigid arcuate shoes 12 arranged end to end around the internal drum surface and adapted to be pressed against the latter by a momentum type actuator including a selectively controllable pilot clutch 13. As usual, an inturned flange 14 on the drum is bolted to the wheel 11 which, in this instance is journaled through a bearing 15 on a dead axle 16.

While additional brake shoes may be employed, there are two in the present instance each comprising a semi-cylindrical strip covered by a layer 17 of suitable friction material and welded to the outer edge of a rib formed by plates 18 lying side by side in the plane of the center line of the shoe, the plates being secured together by rivets 19. Opposite ends 20 of each shoe rib 18 are notched, as shown in FIG. 1, to fit closely around the enlarged intermediate portions of pins 21 rigid with an anchor plate 22 on diametrically opposite sides of the axle and projecting inwardly from the plate parallel to the axle. As shown in FIG. 4, the reduced outer ends of the pins project through holes in the anchor plate and thick washers 23 and are deformed as indicated at 24 to fix the pin to the plate. The latter takes the form of a disk closing the open end of the drum and bolted at 25 to a flange on the axle 16. Coiled springs 26 stretched between the adjacent ends of the ribs 18 contract the shoes 12 away from the drum and against the anchor pins and normally hold the brake released. Two hair pin type springs 27 (FIGS. 1 and 2) with bent over ends 27a project through matching holes in the anchor plate and the ribs 18 and thus hold the shoes against the depressed part of the plate and thus centered relative to the drum.

In the form shown, the pilot clutch 13 for deriving an actuating torque from the rotation of the drum 10 is of the magnetic type and includes an armature ring 28 concentric with the axle and supported through a plurality of tangentially disposed leaf springs 29 from the drum flange 14 adjacent the inner end of the drum. The armature thus rotates with the drum and is adapted for axial movement by bending of the leaf springs. The inner axially facing surface of the armature is adapted for axial gripping engagement with the opposed face of a rigid magnet ring 30, such face being formed by inner and outer pole faces 31, 32 flush with segments 33 of friction material seated in the ring 30. The latter is composed of magnetic material and is of U-shaped cross-section so as to form with the armature a toroidal flux path 34 enclosing a winding 35 fastened within the magnet core. Thus, whenever the winding is energized, the armature will grip the magnet face and derive a friction torque tending to turn the magnet with the armature.

To permit of such turning through a limited range relative to the anchor plate, the present invention contemplates supporting the magnet core by a multiple point bearing with at least two points formed by the anchor pins 21 and other bearing points formed by supports 37 carried by the movable shoes 12 and forming part of the mechanism for utilizing the magnet motion to expand the shoes against the drum. While plain bearing surfaces may be used in the multiple point support, it is preferred to provide bearings of the anti-friction type.

To this end, rollers 38 are journaled on the inner ends of the pins 21 between the ends 20 of the shoe ribs and snap rings 39 by which the rollers are held on the pins. Preferably the outer edges of the rollers are enlarged to limit the permissible outward movement of the magnet ring. The rollers 38 are of course spaced equidistantly from the drum axis and contact the outer periphery of the magnet on diametrically opposite sides of the axle thus centering the ring and locating the same along one diameter while providing rolling contact which permits of free turning of the magnet about the drum axis.

The other supports 37 also take the form of rollers 40 in the present instance, these being equally spaced outwardly from the brake axis but disposed along a diameter perpendicular to that through the axes of the rollers 38. As shown in FIG. 5, the rollers 40 lie between spread apart portions 41 of the shoe rib plates 18 spanned by pins 42 on which the rollers are journaled through an anti-friction bearing 43 to turn on axes paralleling the rollers 38. The rollers 40 project inwardly just short of the inner edge of the shoe ribs and bear against the outer circumferentially extending surfaces of segments 44 welded against the back of the magnet core 30 on diametrically opposite sides of the axle. The rolling contact with these rollers completes the desired four point bearing support for the magnet.

Figure 7:
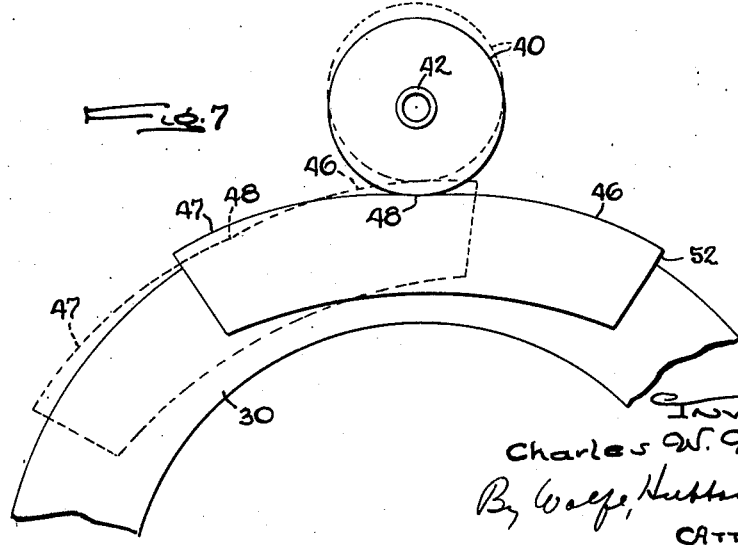
FIG. 7 is a fragmentary view of the cam mechanism.

In accordance with the present invention, the outer edge surfaces of the segments 44 are utilized as cams for converting the angular motion of the clutch ring 30 into radial pressure exerted on the shoes 12 through the medium of the rollers 40 which thus constitute followers for the cams. For this purpose and to enable the brake to be applied with the drum turning in either direction, the cam surfaces are made of heart shape, that is to say, opposite end portions 46 and 47 converge circumferentially and inwardly from high points at the outer ends of the segments and merge with each other at a low midpoint 48 in which the roller 40 is seated as shown in full in FIG. 7 when the magnet ring is in brake-released position. Thus, as the magnet turns in either direction away from this position, the rollers 40 will ride up the gradual rises 46 or 47 on the segments 44 and thus press the rollers and the shoes 12 outwardly as shown in phantom in FIG. 7. As the shoes come into engagement with the rotating drum surface, they shift endwise slightly in the direction of drum rotation and their leading ends come into abutment with the anchor pins 21. The trailing ends are spaced a short distance away from the anchors.

Turning of the magnet in the direction of drum rotation continues until after clearance between the shoes 12 and the drum 10 has been taken up and the shoes are compressed against the drum under a pressure which is determined by the magnitude of the actuating torque delivered by the pilot clutch. This in turn is proportional to the degree of energization of the winding 35. After the motion of the magnet is arrested, the followers 40 remain in engagement with fixed points on the cam rises as permitted by slipping of the pilot clutch 13. This continues so long as the winding 35 remains energized, thus holding the brake applied.

While the rise of the cams 46, 47 is very gradual in order to amplify the pilot clutch torque to the desired degree in actuating the brake, this rise is sufficient to permit the return springs 26 acting backwardly through the shoes 12 and the followers 40 to reverse the motion of the magnet when the winding is again deenergized. Thus, the rollers 40 ride back down the inclines 46 or 47 until becoming seated in the low point 48 where they are held by the action of the springs 26 until the winding is again energized.

As the brake linings 17 wear away increasing the brake-released clearance, the rollers 40 will rise progressively farther up the inclines 46, 47 for a given degree of energization of the winding 35. To prevent the rollers from riding off from the cam ends in the event of excessive wearing away of the linings, stops are provided on the shoes 12 to limit the range of travel of the magnet. Herein, these stops comprise shoulders 50 formed on the inner edges of the shoe ribs 18 by cutting away arcuate segments 51 thereof on opposite ends of the shoes outwardly beyond the bulging portions 41 of the ribs 18. The shoulders thus lie in the plane of the cam segments 44 and are so spaced angularly from the rollers 40 as to be engaged by ends 52 of the segments after a predetermined turning of the magnet away from brake-released position and before the rollers reach the ends of the active cam rises.

It will be apparent from the foregoing that the two points of bearing support for the magnet provided by the rollers 40 are movable radially in accordance with the application and release of the brake. This does not however destroy the centering of the magnet or the ruggedness of its anti-friction mounting. That is to say, because the bearing contact is between the rollers 40 and the cam surfaces 46 or 47 rather than with the periphery of the magnet itself, the radial spacing of the respective rollers from the brake axis remains equalized during the in and out movements of the brake shoes no matter which of the two cam inclines 46 or 47 is effective. Thus, the magnet remains centered at all times and supported for free turning into and out of brake-released position.

By utilizing the anchor pins and the cams and followers to provide a multiple point support for the magnet, free turning of the latter is assured even without lubrication. In addition, the necessity of a large and separate bearing on the anchor plate is avoided resulting in a great simplification of the overall brake structure.

I claim as my invention:

1. In a friction torque producing device for use with a rotary drum, the combination of, an anchor disk centered on the axis of said drum, anchor pins rigid with said disk and projecting therefrom parallel to said axis, a pair of rigid arcuate shoes arranged in end to end relation around said axis and having internal ribs with adjacent ends abutting against opposite sides of one of said pins, springs each stretched between adjacent ends of said shoes and normally urging the same into abutment with said pins to maintain the device normally released, support rollers journaled on said pins adjacent said ribs, follower rollers journaled on said ribs midway between the ends of said shoes to turn about axes paralleling said drum axis, and an actuator for moving said follower rollers outwardly in unison comprising a magnetically controlled friction clutch and having a rigid magnet ring concentric with said drum axis and disposed between and journaled on said support and follower rollers, and cams fixed to said ring in the plane of said follower rollers and each having an outwardly facing peripheral surface engaging the respective follower rollers, opposite end portions of each of said surfaces converging circumferentially to a low point in which the engaged follower roller is seated when said shoes are contracted against said anchor pins.

2. In a torque producing device for use with a rotary drum, the combination of, an anchor disk centered on the axis of said drum, pins rigid with said disk and projecting therefrom parallel to said axis, rigid arcuate brake shoes arranged in end to end relation around said axis with adjacent ends abutting against opposite sides of one of said pins, means normally urging said shoe ends into abutment with said pins to maintain the device normally released, rollers journaled on said pins adjacent said shoes, and an actuator for spreading said shoes apart comprising a magnetically controlled friction clutch and having a rigid magnet ring concentric with said drum axis disposed between and journaled on said rollers, angularly spaced cams fixed to said ring between said pins and each having an outwardly facing peripheral surface with opposite end portions converging circumferentially to a low point, and followers each carried by one of said shoes and engaging one of said cams.

3. In a torque producing device for use with a rotary drum, the combination of, an anchor disk centered on the axis of said drum, pins rigid with said disk and projecting therefrom parallel to said axis, rigid arcuate shoes arranged in end to end relation around said axis with adjacent ends abutting against opposite sides of one of said pins, means normally urging said shoe ends into abutment with said pins to maintain the device normally released, rollers journaled on said pins adjacent said shoes, and an actuator for spreading said shoes apart comprising a magnetically controlled friction clutch and having a rigid magnet ring concentric with said drum axis disposed between and journaled on said first rollers.

4. In a torque producing device for use with a rotary drum, an anchor plate centered on the axis of said drum, anchors rigid with said plate and projecting therefrom parallel to said axis, rigid arcuate shoes arranged in end to end relation around said axis with adjacent ends abutting against opposite sides of one of said anchors, means urging said shoe ends into abutment with said anchors to maintain the device normally released, rollers journalled on said anchors, follower rollers journaled on said shoes between said anchors to turn about axes paralleling said drum axis, and an actuator for spreading said follower rollers and said shoes apart comprising a magnetically controlled friction clutch and having a rigid magnet ring concentric with said drum axis disposed between and journaled on said first rollers, and cams fixed to said ring in the plane of said follower rollers and having peripheral surfaces engaging said follower rollers.

5. In a friction torque producing device for use with a rotary drum, the combination of, an anchor disk centered on the axis of said drum, anchors rigid with said disk and projecting therefrom parallel to said axis, a pair of rigid arcuate shoes arranged in end to end relation around said axis, springs each stretched between adjacent ends of said shoes and normally urging the same into abutment with said anchors to maintain the device normally released, bearing surfaces on said anchors adjacent said shoe ends, followers on said shoes intermediate the ends thereof, and an actuator for moving said followers outwardly in unison comprising a magnetically controlled friction clutch and having a rigid magnet ring concentric with said drum axis and disposed between and journaled on said bearing surfaces, and cams fixed to said ring in the plane of said follower and each having an outwardly facing peripheral surface engaging the respective followers, opposite end portions of each of said surfaces converging circumferentially to a low point in which the engaged follower is seated when said shoes are contracted against said anchors, said cams and followers coacting with said bearing surfaces to provide a multiple point bearing support to center said ring on and permit turning of the same around said axis.

6. In a torque producing device for use with a rotary drum, the combination of, an anchor disk centered on the axis of said drum, anchors rigid with said disk and projecting therefrom along said axis, rigid arcuate shoes arranged in end to end relation around said axis with adjacent ends abutting against opposite sides of one of said anchors, means normally urging said shoes into abutment with said anchors to maintain the device normally released, bearing surfaces on said anchors adjacent said shoes, and an actuator for spreading said shoes apart comprising a magnetically controlled friction clutch and having a rigid magnet ring concentric with said drum axis and journaled on said bearing surfaces, angularly spaced cams fixed to said ring between said anchors and each having an outwardly facing arcuate peripheral surface with opposite end portions converging circumferentially to a low point, and followers each carried by one of said shoes and engaging one of said cams, said cams being shaped to maintain said followers equidistant from said axis in the different angular positions of said ring and thereby coact with said anchors in holding the ring centered on said axis.

7. In a torque producing device for use with a rotary drum, the combination of, an anchor disk centered on the axis of said drum, projections rigid with said disk and extending therefrom parallel to said axis, rigid arcuate shoes arranged in end to end relation around said axis with adjacent ends abutting against opposite sides of one of said projections, means normally urging said shoe ends into abutment with said projections to maintain the device normally released, and an actuator for spreading said shoes apart including a rigid ring concentric with said drum axis disposed between said projections and journaled at spaced points around its outer periphery on the projections, selectively operable means for applying torque to one face of said ring to turn the same about the bearing formed by said projections, and means for expanding said shoes in response to turning of said ring.

8. In a friction torque producing device for use with a rotary drum, the combination of, an anchor disk centered on the axis of said drum, anchors rigid with said disk and projecting therefrom parallel to said axis, a plurality of rigid arcuate shoes arranged in end to end relation around said axis, springs each stretched between adjacent ends of said shoes and normally urging the same into abutment with said anchor to maintain the device normally released, followers on said shoes intermediate the ends thereof, and an actuator for moving said followers outwardly in unison comprising a rigid ring concentric with said drum axis, cams fixed to said ring in the plane of said follower and each having an outwardly facing peripheral surface engaging the respective followers, said cams and followers coacting to provide a multiple point bearing support centering said ring on said axis while permitting turning of the ring, and means for turning said ring and said cams about said axis to expand said shoes against said drum.

References Cited in the file of this patent
UNITED STATES PATENTS

| | | |
|---|---|---|
| 1,603,963 | Liebowitz | Oct. 19, 1926 |
| 1,925,897 | Fawick | Sept. 5, 1933 |
| 2,068,588 | Algee et al. | Jan. 19, 1937 |
| 2,352,218 | Oetzel | June 27, 1944 |
| 2,451,325 | Eksergian et al. | Oct. 12, 1948 |